Figure 1:
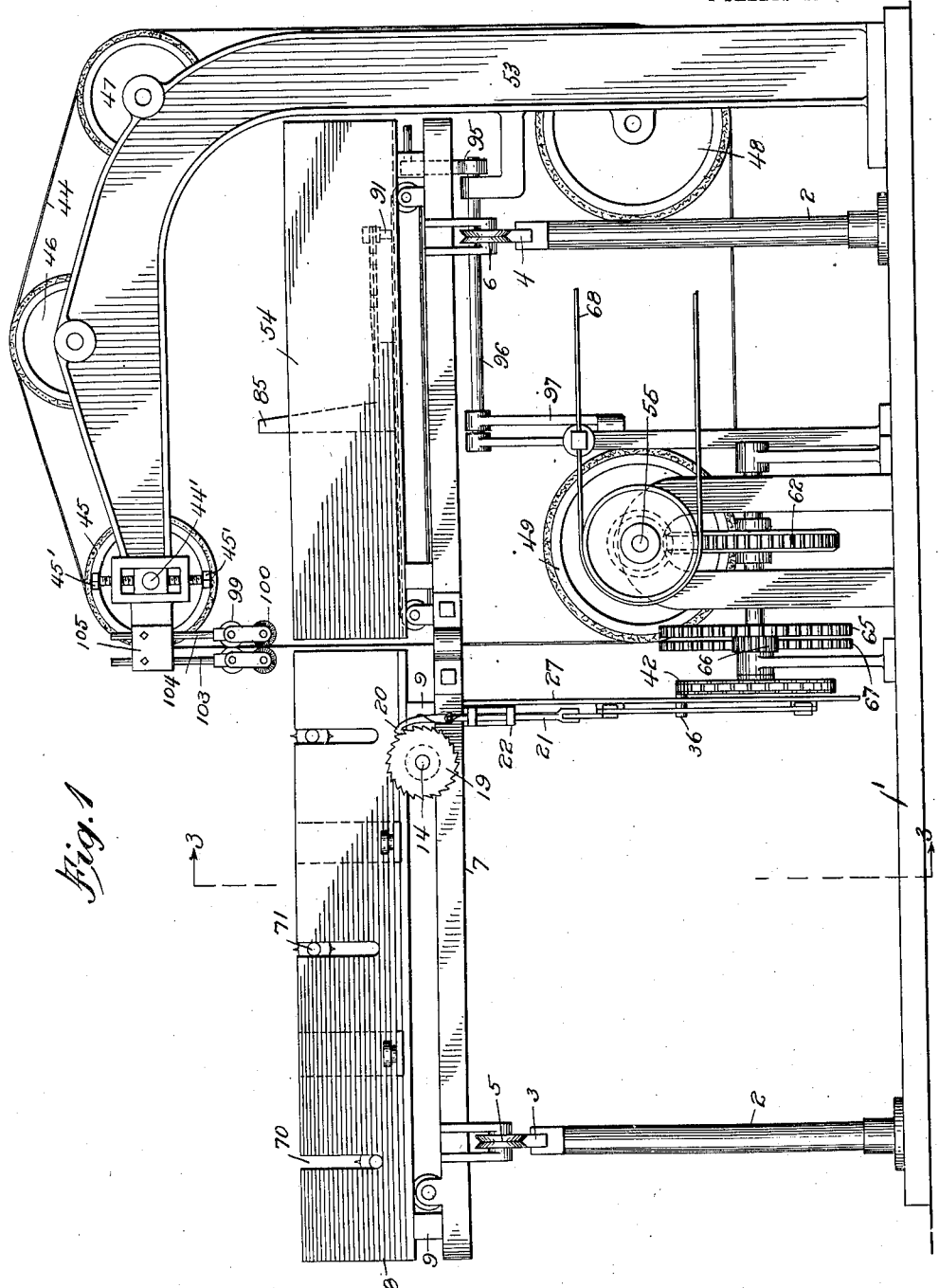

L. LINKIEWICZ.
MEAT SLICER.
APPLICATION FILED APR. 11, 1913.

1,079,778.

Patented Nov. 25, 1913.

4 SHEETS—SHEET 1.

WITNESSES
F. D. Swett
A. L. Kitchin

INVENTOR
Leopold Linkiewicz
BY Munn & Co.
ATTORNEYS

L. LINKIEWICZ.
MEAT SLICER.
APPLICATION FILED APR. 11, 1913.

1,079,778.

Patented Nov. 25, 1913.
4 SHEETS—SHEET 2.

WITNESSES
F. D. Sweet
A. L. Kitchin

INVENTOR
Leopold Linkiewicz
BY Munn & Co
ATTORNEYS

L. LINKIEWICZ.
MEAT SLICER.
APPLICATION FILED APR. 11, 1913.
1,079,778.
Patented Nov. 25, 1913.
4 SHEETS—SHEET 3.
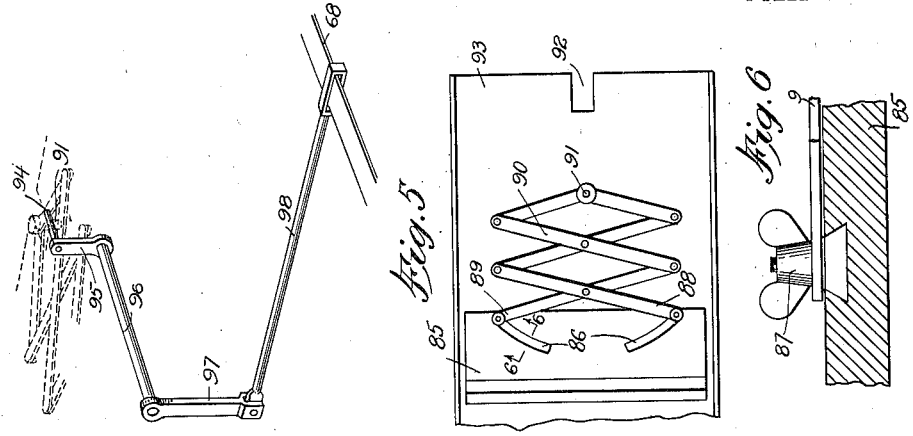
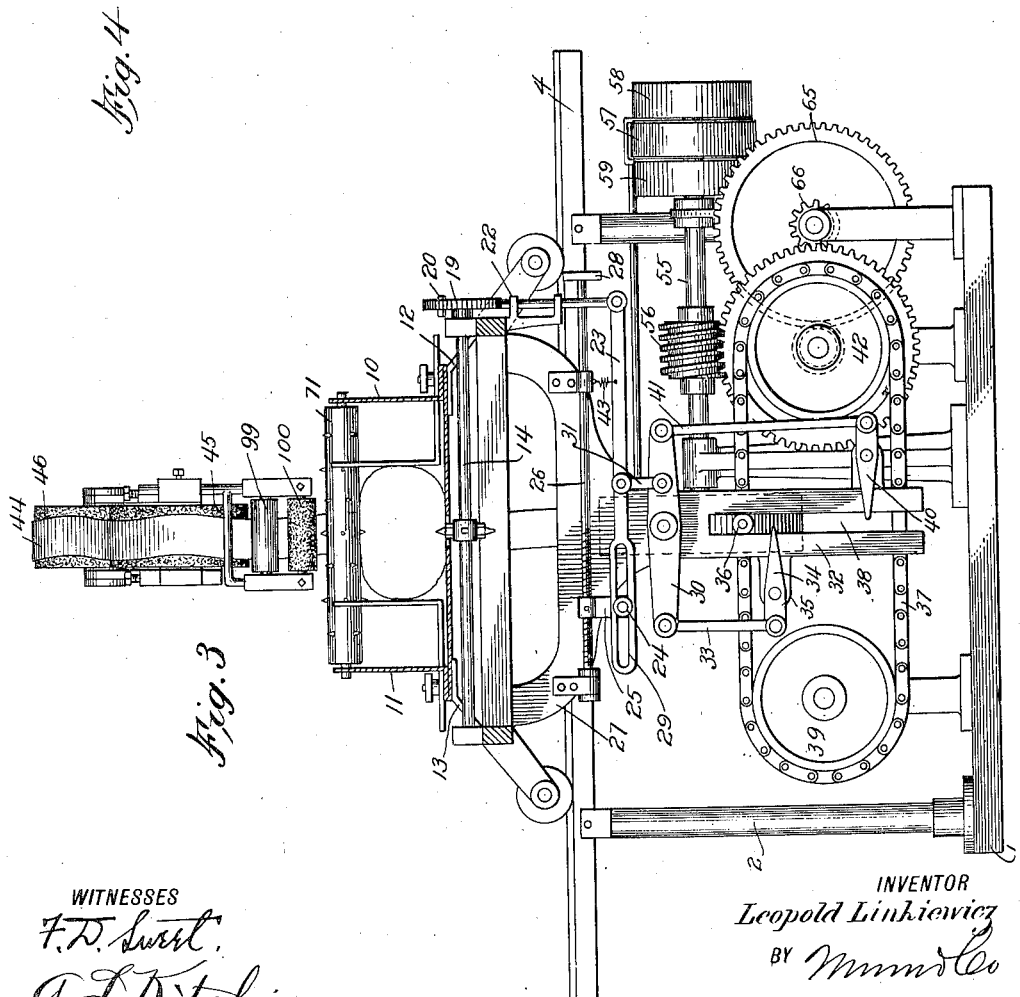
WITNESSES
F. D. Surel.
A. L. Kitchin.
INVENTOR
Leopold Linkiewicz
BY Munn & Co
ATTORNEYS L. LINKIEWICZ.
MEAT SLICER.
APPLICATION FILED APR. 11, 1913.
1,079,778.
Patented Nov. 25, 1913.
4 SHEETS—SHEET 4.
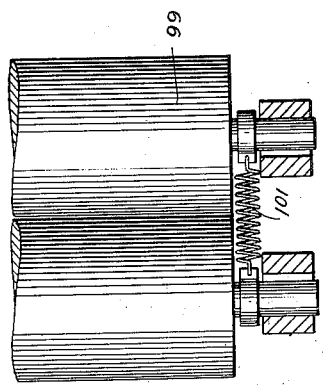
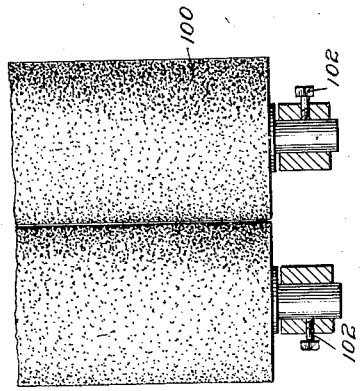
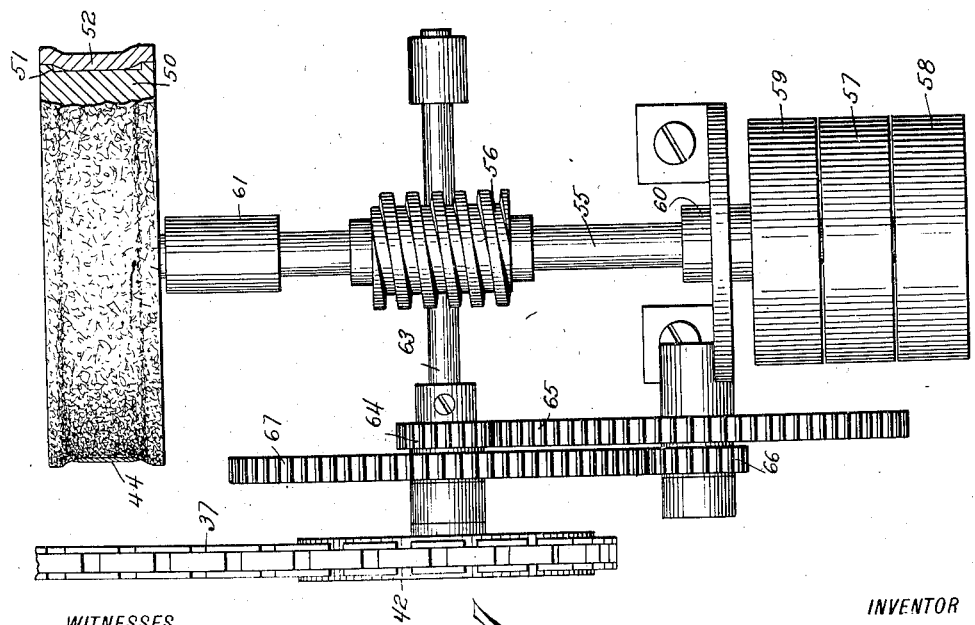
INVENTOR
Leopold Linkiewicz
BY
ATTORNEYS

UNITED STATES PATENT OFFICE.

LEOPOLD LINKIEWICZ, OF NEW YORK, N. Y.

MEAT-SLICER.

1,079,778.

Specification of Letters Patent. Patented Nov. 25, 1913.

Application filed April 11, 1913. Serial No. 760,398.

*To all whom it may concern:*

Be it known that I, LEOPOLD LINKIEWICZ, a citizen of the United States, and a resident of the city of New York, borough of Brooklyn, in the county of Kings and State of New York, have invented a new and Improved Meat-Slicer, of which the following is a full, clear, and exact description.

This invention relates to improvements in meat slicing devices, and has for an object to provide an improved structure which will quickly and uniformly cut or slice meat and retain the same substantially in a normal position during the slicing operation, so that the finished piece of meat will remain substantially in its original shape though in slices.

A further object of the invention is to provide a simple, positively operating machine designed to cut a piece of meat and cut the same in slices of any desired thickness without exposing the sides of the slices to the air, so that the meat will remain in a compact body after being sliced, and so retain its moist condition until ready for use.

A still further object of the invention more specifically, is to form a device in which a reciprocating and oscillating supporting traveler is used, together with a band knife for slicing the meat arranged on the carriage, the parts being so arranged that the same may be adjusted for cutting slices of any desired thickness and for operating automatically as long as the power is turned on, so that the entire piece of meat may be sliced without stopping the machine.

In carrying out the objects of the invention, a carriage is provided designed to move back and forth or reciprocate on suitable carriers on a suitable track. This carriage is provided with a feeding or traveling member for the meat, or other article placed thereon so that the meat may be fed forward a given distance upon each reciprocation or movement of the carriage. This feeding forward of the meat will allow the knife to sever the meat into slices and to cut a slice upon each movement of the carriage, the knife being formed as a double edged band knife. The same power mechanism which operates the knife is connected with the carriage for shifting the same back and forth, and with a feeding mechanism designed to feed the meat step by step forwardly toward the knife. This feeding mechanism is formed with an adjusting member whereby any thickness of slices may be provided without changing the meat or any feature of the device except the feeding mechanism. In forming the carriage, a receiving portion is provided for receiving the uncut meat, and a discharge or retaining portion is provided designed to receive the slices of cut meat. On this discharge portion is arranged a filling or movable stop for holding the severed parts of the meat in their original upright position so that when the complete piece of meat has been sliced, the same will be arranged on the delivery portion of the carriage in substantially the same position or shape as the original piece of meat before slicing.

A practical embodiment of the invention is represented in the accompanying drawings forming a part of this specification, in which similar characters of reference indicate corresponding parts in all the views.

Figure 2:
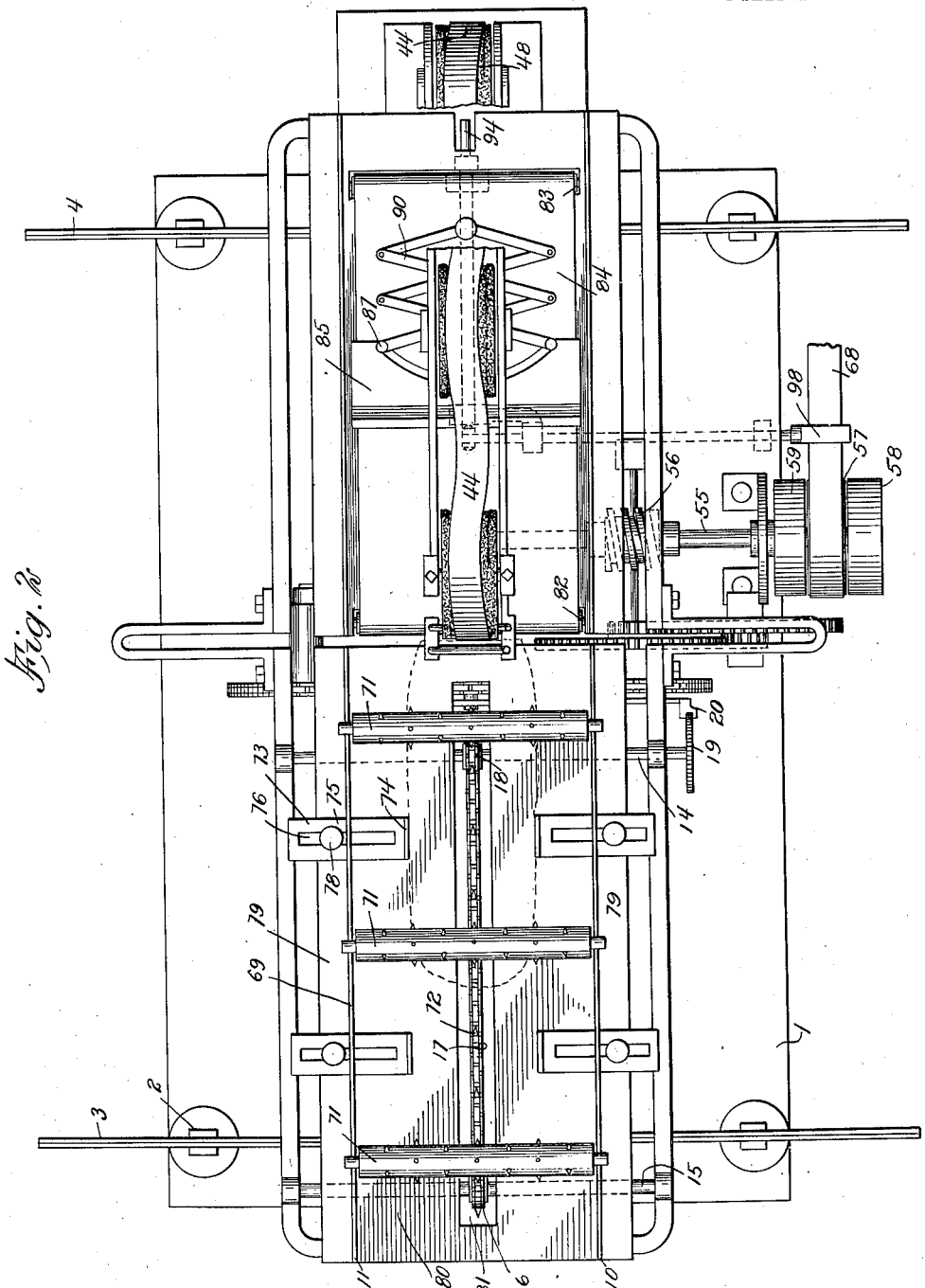

Figure 1 is a side elevation of an embodiment of the invention; Fig. 2 is a top plan view of the structure shown in Fig. 1; Fig. 3 is a section through Fig. 1 on the line 3—3; Fig. 4 is a detail fragmentary perspective view showing the power cut-off or shifting mechanism; Fig. 5 is a fragmentary top plan view of the discharge portion and follower of the carriage; Fig. 6 is a detail fragmentary sectional view on the line 6—6 of Fig. 5, the same being shown on an enlarged scale; Fig. 7 is an enlarged top plan view of the driving mechanism; Fig. 8 is a fragmentary top plan view of a pair of knife guiding and centering rollers and associated parts; and Fig. 9 is a view similar to Fig. 8, disclosing a pair of cleaning brushes.

Referring to the accompanying drawings by numerals, 1 indicates a base on which are mounted a plurality of posts or uprights 2. On the uprights 2 are arranged tracks 3 and 4 designed to engage suitable wheels 5 and 6, connected with the framework 7 of the carriage 8. The framework 7 is provided with a pair of cross bars 9, above which are arranged side members 10 and 11, these side members being connected with the framework 7 by suitable supporting brackets 12 and 13 (Fig. 3). On the frame 7 are arranged a pair of shafts 14 and 15, the shaft 15 being substantially an idler, but carrying a sprocket wheel 16 so as to properly support a chain 17. The chain 17 also passes over a sprocket 18 rigidly secured to the shaft 14, by which it is driven and by which chain 17 is moved. On one end of shaft 14 is secured a ratchet wheel 19 designed to be engaged by a spring-pressed hook member 20 operated by a suitable rod 21 held in place by a guide 22. Pivotally connected with rod 21 is a lever 23, which in turn is pivotally connected at 24 to an adjustable bracket 25 mounted upon a screw member 26. The screw member 26 is supported on a hanger 27 rigidly secured to the carriage 8, and is permitted a free rotary movement, but is not permitted a longitudinal movement. Upon the rotation of shaft 26 by the thumb member 28, bracket 25 will be adjusted back and forth according to the movement of the shaft 26, the same being threaded, and also bracket 25 being correspondingly threaded. The connecting pin 24 on bracket 25 projects through a slot 29 in the arm 23 so that the bracket may be easily adjusted relatively to the arm and thus cause a greater or less throw to the pawl 20. In order to cause a proper pivotal movement to lever 23, the same is connected with a double acting lever or walking beam 30 by link 31. The double acting lever 30 is pivotally mounted upon the depending portion 32 of member 27 so that the same is carried back and forth with the carriage. A link 33 is pivotally connected at one end of lever 30 and is also connected with the stop 34 pivotally connected to the bracket 35. The stop 34 is adapted to be in the path of movement or travel of a lug 36 secured to chain 37. The lug 36 continually remains in slot 38 in the depending portion 32 of member 37 and thereby moves the carriage 8 back and forth as the chain 37 moves. As the link carrying the stop 36 moves around the sprocket wheel 39, stop 34 will be operated, whereby lever 23 is given a movement in one direction and the ratchet wheel 19 (Fig. 1) is moved a step forward a predetermined distance. In its downward travel projection 36 strikes against a pivotal stop 40 and moves the point thereof downwardly and link 41 upwardly, whereby the lever 23 is moved back to its original elevated position and pawl 20 is caused to engage another tooth in wheel 19. The parts remain in this position until the link carrying projection 36 passes around sprocket wheel 42, whereupon stop 40 is actuated so as to cause rod 21 connected with lug 23 to move downwardly and cause pawl 20 to move ratchet wheel 19 another step forward. The continued upward movement of the projection 36 will cause the same to strike against stop 34 for resetting lug 23 and associated parts. If desired, a spring 43 could be used to reset the various parts. By this construction and arrangement it will be observed that as the carriage is moved back and forth, chain 17 (Fig. 2) is moved forward step by step, a movement of chain 17 occurring for each movement of the carriage 8. This will allow the knife 44 to cut a slice upon each movement of the carriage.

The knife 44 is constructed preferably very thin and with a double edge, each edge be-scalloped or formed in waves so as to better sever or cut the meat. The knife is of the endless variety and is arranged to travel upon idlers 45, 46, 47, and 48, and upon a driver 49. These wheels guide the knife in its movement and hold the same properly in place for severing the meat. Each of these wheels is made with a body 50 having a groove 51 in which is arranged a covering of felt 52. The covering of felt is slightly grooved so as to conform to the groove 51 and to properly hold the blade 44 in place against the slight side pressure brought to bear thereon when the knife strikes the meat. The knife is intended to be moved at a comparatively high speed so that the side pressure will be very small and will not force the knife from its correct position on the various supporting and driving wheels. A suitable support or crane 53 is provided for the wheels 45 to 48 inclusive, so as to hold the same in proper place and yet allow a proper action of the discharge portion 54 of the carriage 8. In connection with the drive wheel 49 for the knife, it will be observed that the same is mounted upon shaft 55 (Fig. 7) which shaft also carries worm 56, power pulley 57, and idlers 58 and 59. The shaft 55 is supported by suitable bearings 60 and 61 so that the knife may be easily placed upon wheel 49 and removed therefrom without molesting the driving parts. The worm 56 is designed to mesh with a worm wheel 62 so as to drive the same simultaneously with wheel 50, but at a slower speed. The worm gear 62 is secured to shaft 63, to which is rigidly secured a pinion 64 meshing with gear wheel 65. A pinion 66 is rigidly secured to the same shaft as the gear wheel 65 that power may be transmitted to the sprocket wheel 67. The gear wheel 67 is loosely mounted upon the shaft 63, but has rigidly secured thereto sprocket wheel 42, which carries chain 37. In this way when power is transmitted through belt 68 to power wheel 57, the knife will be driven at a high rate of speed, while the carriage 8 will be moved back and forth comparatively slowly.

From Figs. 1 and 2 it will be observed that the portion 69 of carriage 8 is provided with a plurality of slots 70 in which are arranged spike rollers 71. These rollers are designed to be made of an appreciable weight so as to engage the meat and hold the same on the spikes 72 arranged on chain 17. This will allow the chain 17 to feed the meat positively toward the knife 44.

When the piece of meat is comparatively small, clamps 73 are utilized for guiding the meat. The clamps 73 are formed with upright portions 74 and bases 75, in which are arranged slots 76 designed to accommodate a clamping screw 78 for binding the clamps to the flanges 79 on the sides 10 and 11. It will be observed that the sides 10 and 11 not only merge into the flanges 79, but also merge into and form a bottom 80 in which a slot 81 is provided for accommodating chain 17.

In the portion 54 is arranged a pair of rollers 82 and 83, on which is mounted an endless belt 84 designed to receive the sliced meat. A follower 85 is placed on the belt 84 and is adapted to prevent the falling over of the sliced meat so that as the successive slices are cut off, the same will remain in their original vertical position. As the piece of meat is being gradually cut or sliced, part thereof will press against the follower 85 and move the same gradually toward the discharge end of portion 54. The follower 85, as shown in Fig. 5, is provided with arc shaped grooves 86, in which dove-tailed set screws 87 are arranged (Fig. 6), so as to clamp the links 88 and 89 against pivotal movement. Links 88 and 89 form part of the lazy tongs structure 90 carrying at its outer end a pin 91. The pin 91 is adapted to drop through notch 92 in the bottom 93 of portion 54 of the carriage 8 when the belt 84 is full. The dropping of pin 91 through notch 92 will cause the same to engage pin 94 arranged on crank 95, which in turn is rigidly secured to shaft 96. The shaft 96 is rigidly secured to lever 97, carrying a belt shifting link 98 designed to loosely surround belt 68. When pin 91 strikes pin 94 and the carriage moves in the usual manner, the pin 94 will be moved laterally with the carriage and will turn or rock the shaft 96, which will move longitudinally link 98 and move the belt 68 from the fixed pulley 57 either to pulley 58 or 59, whereupon the machine will stop. Where a short piece of meat is being cut, the thumb screws 87 (Fig. 6) are adjusted so as to lengthen out the lazy tongs 90 in order that the pin 91 may drop through slot 92 as soon as all of the meat is severed. In this way various sized pieces of meat may be placed in the machine and severed, the machine being given no attention after once being adjusted.

In order that the knife 44 may be properly maintained in a clean condition, a pair of rollers 99 are provided, and also a pair of rotary bristles 100 (Figs. 1, 8 and 9). The rollers 99 are designed to clamp the knife yieldingly under the action of the spring 101 while the bristles 100 are held against rotary movement normally by set screws 102. The bearing for rollers 99 is elongated slightly to allow a slight back and forth movement, as clearly shown in Fig. 8. These rollers are mounted upon adjustable supporting members 103 and 104, rigidly clamped by any desired means, as for instance set screws, to the extension 105 projecting from the hanger 53. By providing this cleaning mechanism at this point, the edge of the knife is kept perfectly clean and will properly engage and cut the meat.

It will be observed that in adjusting the knife 44, the shaft 44' (Fig. 1) may be adjusted by set screws 45' so as to regulate the tension of the blade and to cause the same to be maintained tight at all times. This is an advantage where a blade accidentally breaks and is secured together, as the adjustment may be made for compensating for the shortening of the blade.

Having thus described my invention I claim as new and desire to secure by Letters Patent:—

1. In a meat slicing machine, a meat supporting carriage, means for moving said carriage back and forth, means for feeding a piece of meat on said carriage longitudinally of the carriage, a knife adapted to engage and slice said meat, means for receiving the severed slices of meat, means for supporting said severed slices of meat in substantially their original position, and a stop mechanism associated with said last mentioned means for automatically stopping the movement of the carriage.

2. In a meat slicing machine of the class described, a reciprocating carriage, means for slicing a piece of meat arranged on said carriage, a follower block arranged to support the severed piece of meat, means for feeding said meat forward, a flexible member connected with said block formed with a depending pin, driving means for said carriage, disconnecting mechanism for disconnecting said driving means and said carriage said mechanism being formed with an arm, said arm being arranged in the path of movement of the pin on said flexible member after the same has been moved off the end of the discharge portion of the carriage whereby a movement of the carriage will transmit movement to the disconnecting mechanism for throwing off the power.

3. In a meat slicing machine, a band knife, and a guiding and cleaning member adapted to engage said knife, said guiding and cleaning member comprising a supporting structure, a pair of clamping rollers, means for holding said clamping rollers in contact with the knife, a pair of cleaning bristles, and means for clamping said bristles against movement.

4. In a meat slicing machine, a movable meat supporting member, means for slicing meat on said meat supporting member, and a stop mechanism for automatically stopping the movement of said meat supporting member, said stop mechanism including a slidable block, a stop pin, and means for connecting said pin with said slidable block, said last mentioned means being designed to space said pin different distances from said block for causing the pin to release said meat supporting member from the driving power at different times.

5. In a meat slicing machine of the character described, a reciprocating supporting member, means for slicing an article arranged on said supporting member, a follower block arranged to support the severed pieces from said article, means for feeding said article forward, a lazy-tong structure connected with said block, a depending pin connected with the outer end of said lazy-tong structure, means for locking said lazy-tong structure in any of its adjusted positions, whereby said pin may be positioned at different distances from said block, driving means for said supporting member and for said slicing means, disconnecting mechanism for disconnecting said driving means from said member and the slicing means, said disconnecting mechanism being formed with an arm arranged in the path of movement of the pin on said lazy-tong after the same has been moved off the end of the discharge opening of said supporting member, whereby a movement of the supporting member will transmit movement to the disconnecting mechanism for throwing off the power.

6. In a meat slicing machine, a movable supporting member, slicing means co-acting with said movable supporting member, and a stop mechanism for automatically stopping the movement of said supporting member, said stop mechanism including a slidable block, a depending pin, and means for connecting said pin and said slidable block, said last mentioned means being adapted to space said pin different distances from the block for causing the pin to release said supporting member from the driving power at different times.

In testimony whereof I have signed my name to this specification in the presence of two subscribing witnesses.

LEOPOLD LINKIEWICZ.

Witnesses:
A. L. KITCHIN,
PHILIP D. ROLLHAUS.